(12) United States Patent
Hanson et al.

(10) Patent No.: US 10,606,725 B2
(45) Date of Patent: Mar. 31, 2020

(54) MONITOR PERIPHERAL DEVICE BASED ON IMPORTED DATA

(71) Applicant: Hewlett Packard Enterprise Development LP, Houston, TX (US)

(72) Inventors: Thomas Hanson, Fort Collins, CO (US); Justin E. York, Houston, TX (US); Kenneth C. Duisenberg, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/402,569

(22) Filed: May 3, 2019

(65) Prior Publication Data
US 2019/0258554 A1    Aug. 22, 2019

Related U.S. Application Data

(63) Continuation of application No. 15/190,432, filed on Jun. 23, 2016, now Pat. No. 10,282,267.

(51) Int. Cl.
*G06F 11/30* (2006.01)

(52) U.S. Cl.
CPC ...... *G06F 11/3013* (2013.01); *G06F 11/3031* (2013.01); *G06F 11/3093* (2013.01)

(58) Field of Classification Search
CPC .................................................. G06F 11/3013
See application file for complete search history.

(56) References Cited

U.S. PATENT DOCUMENTS

| | | | |
|---|---|---|---|
| 5,628,029 A | 5/1997 | Evoy | |
| 6,041,183 A * | 3/2000 | Hayafune | G06F 9/4411 717/173 |
| 7,237,101 B1 | 6/2007 | Dono et al. | |
| 7,350,066 B2 | 3/2008 | Chen et al. | |
| 7,704,147 B2 | 4/2010 | Quraishi et al. | |
| 9,075,845 B1 * | 7/2015 | Thayer | G06F 11/3051 |
| 9,509,718 B1 * | 11/2016 | Arthur | G06Q 10/06 |
| 2004/0122989 A1 | 6/2004 | Hall et al. | |
| 2005/0172101 A1* | 8/2005 | Mach | G06F 13/4291 712/2 |
| 2007/0220529 A1* | 9/2007 | Sheshagiri | G06F 9/4411 719/320 |
| 2008/0159210 A1* | 7/2008 | Zaks | H04W 72/06 370/329 |
| 2010/0228854 A1* | 9/2010 | Morrison | H04L 29/00 709/224 |

(Continued)

FOREIGN PATENT DOCUMENTS

WO    WO-2015116176    8/2015

OTHER PUBLICATIONS

Slaight, T., "Server Management Controllers, Sensors, and Tools", (Research Paper), Mar. 1, 2001, 70 pages.

*Primary Examiner* — Farley Abad
(74) *Attorney, Agent, or Firm* — Jaffery Watson Mendonsa & Hamilton

(57) ABSTRACT

Various examples described herein provide for monitoring a peripheral device by data imported from the peripheral device. The peripheral data may comprise a script associated with monitoring or managing the peripheral device, or descriptive data describing a set of monitor values on the peripheral device.

20 Claims, 7 Drawing Sheets

(56) References Cited

U.S. PATENT DOCUMENTS

| | | |
|---|---|---|
| 2012/0137159 A1 | 5/2012 | Chin et al. |
| 2013/0297830 A1* | 11/2013 | Pao ...................... G06F 13/102 |
| | | 710/3 |
| 2015/0113178 A1 | 4/2015 | Lambert et al. |
| 2016/0234338 A1* | 8/2016 | Biron, III ............ G06F 9/45512 |

* cited by examiner

MONITOR PERIPHERAL DEVICE BASED ON IMPORTED DATA

PRIORITY

The present patent application is a Continuation application claiming priority from application Ser. No. 15/190,432, filed Jun. 23, 2016, which is currently pending.

BACKGROUND

Health and status monitoring of peripheral devices faces challenges from the host computing device architecture and with respect to coupling host software and peripheral device firmware. For management processors, such as baseboard management controllers (BMCs), bus architecture may prevent a peripheral device from raising an interrupt or otherwise notifying a host computing device coupled to the peripheral device (e.g., installed within the host computing device) that an event has occurred. Additionally, host peripheral monitoring software often requires a high level of information about the peripheral devices to provide detailed/descriptive reporting. Often, this can require updating the host peripheral monitoring software whenever a peripheral device is updated.

BRIEF DESCRIPTION OF THE DRAWINGS

Certain examples are described in the following detailed description in reference to the following drawings.

DETAILED DESCRIPTION

Figure 1:
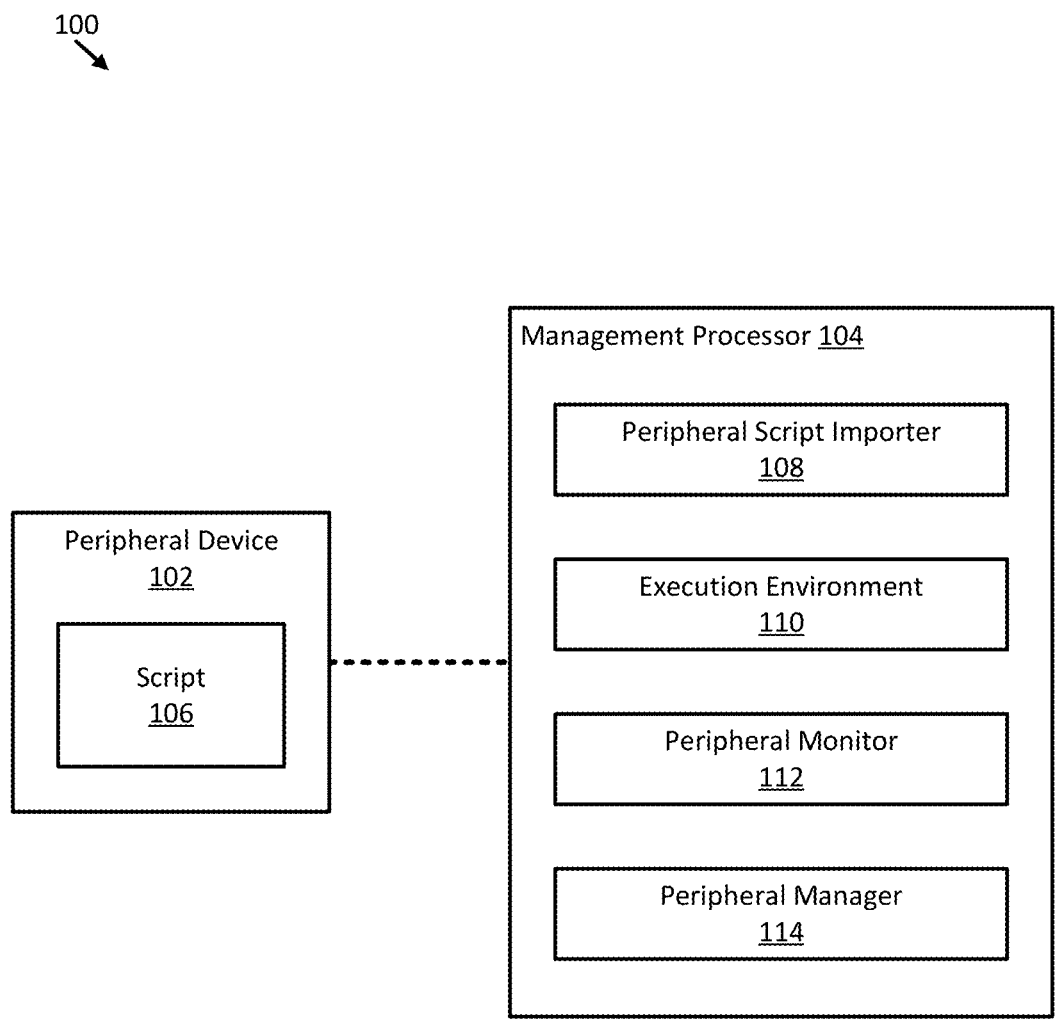
FIGS. 1 through 5 are block diagrams illustrating example management processors according to the present disclosure.

Traditionally, a capability of a host computing device can be modified or enhanced by coupling to the computing device a set of peripheral devices, and the host can include a management processor to remotely or locally manage a set of peripherals coupled to the computing device. Management processors can include built-in logic to provide management (e.g., remote or local management) of a set of peripheral devices coupled to the computing device. However, the built-in logic of a management processor may not reflect or use all aspects of management that are available for a given peripheral device. For instance, a management processor may be older than a peripheral device, and thus the management processor may not be capable of accessing newer technology included in the peripheral device. In another example, some management processors may include a limited amount of memory or storage for programming, and thus cannot be updated to include updated built-in logic to provide management for various peripheral devices coupled to the computing device. Accordingly, a management processor may not provide some management actions that may be available with respect to a particular peripheral device.

According to some examples described herein, a peripheral device previously unknown to a management processor can provide the management processor with the information needed so that the management processor can monitor or manage the peripheral device. Some examples described herein may permit a management processor to handle monitoring or management of a peripheral device without need for a firmware update to the management processor, and may do so even when firmware of a peripheral device is updated or when differences exist within and across peripheral device vendors. Additionally, some examples described herein may enable a software application (e.g., monitoring or management software application) that does not possess the knowledge to communicate with a peripheral device, to communicate with the peripheral device through a management processor coupled to the peripheral device (e.g., over a data bus). In this way, various examples described herein can monitor or manage a diverse set of peripheral devices (e.g., varying in type, make, or vendor) without need of increasing complexity or updating the logic of the monitoring or management software application. Furthermore, some examples obviate the need for running specialized software on an operating system (OS) (e.g., management agents) to monitor or manage a peripheral device, where such specialized software may only operate on a computing device (e.g., server) when the computing device is powered on.

Various examples provide for monitoring (e.g., health or status) or managing a self-describing peripheral device. In particular, examples may comprise a management processor capable of importing, from a peripheral device, data that enables or implements logic in the management processor for performing monitoring or management activities with respect to the peripheral device. By way of importing data from the peripheral device, the peripheral device can effectively self-describe its monitoring or management functionality to the management processors, thereby permitting the management processor to make use of such functionality. As described herein, some examples may implement a script-based approach for a peripheral device to describe itself to a management processor, whereby the data imported from the peripheral device by the management processor comprises a script. Alternatively, some examples may implement a descriptive data-based approach for a peripheral device to describe itself to a management processor, whereby the data imported from the peripheral device by the management processor comprises descriptive data. With either approach, the management processor may load the imported script or imported descriptive data to permit the management processor to perform monitoring or management functions with respect to the peripheral device.

To facilitate importation of a script or descriptive data from a peripheral device to a management processor, the peripheral device of some examples may implement logic or a protocol (e.g., peripheral device management protocol) that enables the peripheral device to store data, such as a script or descriptive data, as part of the peripheral device (e.g., as part of its firmware). For some examples, the logic or the protocol permits the peripheral device to provide (e.g., upload) the data to the management processor, and may do so in response to the management processor requesting the script or descriptive data from the peripheral device. An example protocol on a peripheral device that may permit such importation can include, without limitation, Discovery and Configuration via iLO (DCi) developed for INTEGRATED LIGHTS-OUT, a management processor offered by HEWLETT PACKARD ENTERPRISE.

Under a script-based approach, the management processor may import a script from the peripheral device and executing that script (or at least a portion thereof) to facilitate a monitoring or management function with respect to the peripheral device. In particular, the script may define functionality for retrieval of a set of monitor values from the peripheral device, and such functionality may be defined by a set of script functions that are generically or uniquely associated with retrieving a set of monitor values. Accordingly, when the script is executed by the management processor, the management processor may retrieve a set of monitor values from the peripheral device for monitoring the peripheral device. Through the script, the management processor ask the peripheral device if it has anything to report and receive data from the peripheral device in response. The management processor may periodically execute the script to obtain data from the peripheral device to monitor the peripheral device.

Further, the script when executed by the management processor may enable the management processor to discover an event or condition with respect to the peripheral device based on the monitoring performed by the management processor. For instance, by way of a set of monitor values retrieved from the peripheral device through the script, the management processor can monitor for a change in online status, the monitor for error conditions, monitor an operational mode (e.g., normal or backup mode), or performance of the peripheral device. For instance, a Network Interface Card (NIC) coupled to a management processor may report a "link drop" event when a communications link is lost, and using a script imported from the NIC, the management processor may read the "link drop" event from the NIC based on output from the script when executed. In another instance, a storage peripheral device (e.g., storage adapter) may report a "drive failed" event when a single drive within a redundant array of inexpensive disks (RAID) array fails, and using a script imported from the storage peripheral device, the management processor may read the "drive failed" event from the storage peripheral device based on output from the script when executed.

For some examples, the script when executed by the management processor may discover (or assist in discovering) an event or condition of a peripheral device by way of identifying a trend in a set of monitor values retrieved from the peripheral device via the script. For instance, the script when executed by the management processor may: cause capture of data points (e.g., on monitor values or overall performance) from the peripheral device over a period; cause storage of the captured data points (e.g., on local memory of the management processor); and perform a trend analysis on the stored data points to identify a possible data trend. Based on an identified data trend, the script may discover the presence, the imminent presence, or possible likelihood of an event (e.g., error event) or condition (e.g., peripheral device failure) with respect to the peripheral device. As way of example, over time a script may cause the capture and storage of data points (e.g., monitor values provided by the script) regarding data error rates of a data processor of a peripheral device, the script may perform a trend analysis on the stored data points, and the script may identify a trend analysis that indicates that the data processor is close to a failure condition.

Under the script-based approach, the script may define how a management processor responds to an event or condition discovered by the management processor. This response functionality may be defined in the script by a set of script functions uniquely or generically associated with responding to discovered events or conditions. For some examples, the script may respond to a particular event or condition by raising an alarm, sending an alert, or taking a corrective action with respect to the particular event/condition. For instance, while monitoring a peripheral device (e.g., a network interface controller [NIC]) via a script, if the management processor determines that the peripheral device is malfunctioning (e.g., reporting a set of error events), when executed by the management processor, the script may respond to the malfunction by disabling or reconfiguring the peripheral device in whole or in part (e.g., disable a network port of the NIC, or rebooting the NIC). In another instance, while monitoring a peripheral device via a script, if the management processor determines that the peripheral device is experiencing a thermal condition (e.g., overheating), when executed by the management processor, the script may respond to the thermal condition by adjusting a cooling system of the enclosure containing the peripheral device to address the condition.

For some examples, in response to the management processor discovering an event or condition with respect to a peripheral device, the script may instruct the management processor to respond by reporting the event/condition to a process external to the script (e.g., a remote management software in communication with the management processor). For instance, the script may cause the management processor to raise an alarm or send an alert with respect to an internal service of the management processor, which in turn may respond to the event or condition (e.g., a corrective action). Alternatively, the script may raise an alarm or send an alert with respect to a remote management software application that is in communication with the management processor (e.g., over a RESTful interface).

For some examples, the script may determine how monitoring data obtained from a peripheral device is presented to a user (e.g., via a peripheral device analysis, which may be provided to a user by an internal service of the management processor or via a remote management software application in communication with the management processor). The script may, for instance, determine what type of data conversion is applied to the monitoring data (e.g., peripheral device register value to a unit of measure relating to the peripheral device, such as temperature or data error rate), how the monitored data is translated (e.g., data protocol translation, such as ASN.1, XML, or JSON), or how the monitoring data is formatted by the management processor (e.g., to permit uniform data formatting and presentation of monitoring data).

With respect to a script-based approach, the management processor may include a support library comprising a set of peripheral-generic functionalities that can be utilized by the script (imported from the peripheral device) in performing a monitoring or management function with respect to the peripheral device. For various examples, the set of peripheral-generic functionalities provided by the support library may be commonly applicable to all peripheral devices that the management processor may monitor or manage, thereby requiring the script to only include the set of functionalities (e.g., monitoring or management functionalities) specific to the peripheral device from which it is imported. In this way, the imported script can comprise the peripheral device-specific logic, while the support library provide the peripheral device-generic logic. This decoupling of specific and generic logic may permit the script to remain small in data size, and may implement a level of security within the management processor where a script is only permitted to perform those functionalities provided through the support library. Some examples of the peripheral generic functionalities provided by the support library can include, without limitation: data communication functions facilitating exchange of data between a script and an another entity over an data interface, such as over a data bus interface between the peripheral device and the management controller or over a RESTful interface between the a remote management software and the management controller; script execution scheduling, such as periodic execution of the script to poll the peripheral device; protocol translators, such as for ASN.1, XML, or JSON; arithmetic operations, such as standard deviation, variance, or line/curve fitting; or data conversion, such as a conversion of a register value to a mode of operation, operational status, temperature, data flow rate, or data size. For some examples, the support library may provide a peripheral-generic functionality that supports a script in capturing data points from a peripheral device, storing the captured data points, or in performing a trend analysis on the stored data points.

Under the descriptive data-based approach, the management processor may import from the peripheral device non-executable descriptive data (e.g., a mapping table) that describes (e.g., attributes, such as location, type, or format, of) a set of monitor values retrievable on the peripheral device. For instance, the descriptive data may describe a location (e.g., referenced by a memory address, index, or object ID) from which a monitor value can be retrieved by the management processor from the peripheral device. In another instance, the descriptive data may describe the data type, data size (e.g., number of bytes), or unit of measure associated with a monitor value retrieved by the management processor from the peripheral device. For some examples, the descriptive data may be smaller in data size than a script providing equivalent monitoring or management functionality. The smaller data size of the descriptive data could be beneficial with respect to saving data storage on the peripheral device. The smaller data size of the descriptive data may also be beneficial in that there is less data bus traffic between the management processor and the peripheral device during the importation process.

Depending on the example, the descriptive data describing the set of monitor values may further include validation data (e.g., value range, list of values, or validation algorithm) that the management processor can use in determining whether a monitor value retrieved from the peripheral device is valid. Additionally, the descriptive data can also include formatting data that the management processor can use in formatting (e.g., size or data format) a retrieved from the peripheral device is valid for display (e.g., to a user).

More regarding examples implementing the script-based approach and the descriptive data-based approach is described below with respect to the detailed description of the drawings.

As used herein, a computing device can comprise a desktop, laptop, workstation, server (e.g., rack-mount server), or other device that operates by a processor, which may include an enclosure to house a peripheral device coupled to the computing device. As used herein, a management processor can include a hardware processor that is dedicated to management of the computing device, and that can execute in a separate or isolated manner from the main processor of the computing system. An example of a management processor can include a baseboard management controller (BMC), which is a specialized microcontroller embedded on a motherboard of a computing device such as a server. A BMC can support the Intelligent Platform Management Interface (IPMI) architecture, which defines a set of common interfaces to computer hardware and firmware that system administrators can use to monitor health and manage a computing device. A BMC can manage the interface between system management software and hardware of the computing device. A BMC of a computing device can provide remote management access to the computing device, and may provide such remote management access over an out-of-band communication channel, which isolates management communication from communication of an operating system (OS) running on the computing device. In some instances, the BMC may enable lights-out management of the computing device, which provides remote management access (e.g., system console access) to the computing device regardless of whether the computing device is powered on, whether a primary network subsystem hardware is functioning, or whether an OS is operating or even installed.

As used herein, a script comprises a file or a set of files that includes code written in interpreted programming language (e.g., scripting language, such as Python, Perl, or JavaScript) and executable within an execution environment (e.g., a runtime environment that supports execution of the scripting language). Additionally, as used herein, execution of a script can comprise execution of some or all of the script. A script may define monitoring or management functionality by a set of script functions defined within the script. For some examples, the execution environment utilized for executing the script is included by a management processor. For some examples, the script can include code written in a non-scripting programming language that is compilable into machine code executable by a management processor. As described herein, by importing a script from a peripheral device, a management processor can import monitoring or management logic directly from the peripheral device and utilize the imported logic to perform a monitoring or management function with respect to the peripheral device.

As also described herein, a script may utilize a peripheral-generic functionality provided by a support library accessible. For instance, a script may utilize a peripheral-generic functionality from the support library that converts a monitor value obtained from a peripheral device register into a value presentable in an analysis (e.g., monitoring report) of peripheral device, such as a temperature or a data flow rate. In another instance, a script can utilize a protocol translator (e.g., ASN.1, JSON, XML) from the support library to translate a data structure included by a monitor value obtained from a peripheral device. In another instance, a script can utilize an arithmetic operation (e.g., standard deviation, variance, mean, mode) or a line or curve fitting function from the support library to analyze a trend with respect to a set of monitor values obtained from the peripheral device.

As used herein, a monitor value may comprise a data value retrievable from a peripheral device for the purpose of monitoring an aspect of the peripheral device. For instance, a monitor value retrieved from a peripheral device can be utilized in monitoring, without limitation, an operational mode, an online/offline status, an operational condition, performance, or a configuration of the peripheral device.

As used herein, descriptive data describing the set of monitor values may comprise non-executable descriptive data. The data may describe a set of attributes for a set of monitor values that can be retrieved from the peripheral device. The non-executable descriptive data may describe how a set of monitor values retrieved from the peripheral device are to be formatted (e.g., how it is to be displayed to a user). Additionally, the descriptive data may include validation data that describes a valid value for at least one monitor value in the set of monitor values retrieved from the peripheral device. Depending on the example, the descriptive data describing the set of monitor values may comprise a mapping table, a data location path for a monitor value, a data type for the monitor value, a data size for the monitor value (e.g., number of bytes), a display format type for the monitor value, or some combination thereof. For various examples, a management processor performs a monitoring or management task by utilizing generic (built-in) code to process specific data provided by the descriptive data describing the set of monitor values.

As used herein, a peripheral device can include a modular computing device component of a computing device (e.g., laptop, desktop, server, or smartphone), which can couple to the computing device through a data interface of the computing device. A peripheral device may couple to a computing device internally (e.g., to a data bus slot or interface within the housing of the computing device) or externally, such as through an external input/out (I/O) interface (e.g., Universal Serial Bus [USB]). Once coupled to a computing device, the peripheral device can be considered installed with respect to the computing device and a management processor of the computing device can communicate with the peripheral device as disclosed herein. Example peripheral devices can include, without limitation, network interface cards (NICs), user input devices, storage devices, storage adapters (e.g., host bus adapters [HBAs]), display adapters, sensors, and the like.

Additionally, as used herein, modules and other components of various examples may comprise, in whole or in part, hardware (e.g., electronic circuitry), or a combination of hardware and programming (e.g., machine-readable instructions, such as firmware), to implement functionalities described herein. For instance, a module may comprise a combination of machine-readable instructions, stored on at least one non-transitory machine-readable storage medium, and at least one processing resource (e.g., controller) to execute those instructions. The machine-readable instructions may comprise computer-readable instructions executable by a processor to perform a set of functions in accordance with various examples described herein. In another instance, a module may comprise electronic circuitry to perform a set of functions in accordance with various examples described herein.

The following provides a detailed description of examples illustrated by FIGS. 1-5.

FIG. 1 is a block diagram illustrating an example management processor 104 according to the present disclosure. In accordance with some examples, the management processor 104 implements a script-based approach to the monitoring or managing of peripheral devices as described herein. FIG. 1 illustrates a computing environment 100 (e.g., a computing device) in which a peripheral device 102 is coupled to the management processor 104. Depending on the example, the peripheral device 102 may couple to the management processor 104 over a wired data path, which may be implemented by a data bus (e.g., Peripheral Component Interconnect, or Peripheral Component Interconnect Express) included in the computing environment 100. Alternatively, for some examples, the management processor 104 couples to the peripheral device 102 over a wireless data path within the computing environment 100. In various examples, the components or the arrangement of components in the peripheral device 102 or the management processor 104 may differ from what is depicted in FIG. 1.

In FIG. 1, the peripheral device 102 includes a script 106, which may be stored on a non-volatile data storage device (e.g., flash memory or the like) included by the peripheral device 102. The non-volatile data storage device (not shown) of the peripheral device 102 may be one that the peripheral device 102 uses to store its firmware. As noted herein, the peripheral device 102 can include, without limitation, a network interface card (NIC), a sensor, a storage device, and the like. The peripheral device 102 may communicate with the management processor 104 over a data bus, which the peripheral device 102 may couple to through a data bus interface (e.g., peripheral device slot).

The management processor 104 includes a peripheral script importer 108, an execution environment 110, a peripheral monitor 112, and a peripheral manager 114. According to some example, the peripheral script importer 108 imports, from the peripheral device 102, a script 106 associated with monitoring or managing the peripheral device 102. During the importation process, the peripheral script importer 108 may request the peripheral device 102 upload the script 106 to the management processor 104, and the peripheral device 102 may respond accordingly. The management processor 104 may store the script 106 in a non-volatile data storage device (not shown) included by the management processor 104.

For various examples, the script 106 stored on the peripheral device 102 may be uniquely associated with the peripheral device 102, uniquely associated with (e.g., applicable to) the make and model of the peripheral device 102, or uniquely associated with (e.g., applicable to) the class of peripheral device for the peripheral device 102. For instance, where the peripheral device 102 is a network interface card (NIC), the script 106 may comprise a script related to all NICs or a script uniquely associated with a certain make and model of the NIC. In another instance, where the peripheral device 102 is a storage device, the script 106 may comprise a storage device-related script or a script uniquely associated with the certain make and model of the storage device.

The execution environment 110 included by the management processor 104 may support execution of one or more interpreted programming languages (e.g., scripting languages) used in a script imported from the peripheral device 102. For some examples, the execution environment 110 is part of the peripheral monitor 118. During operation, the management processor 104 can execute the script 106 within the execution environment 110, which can cause the management processor 104 to initiate communication with the peripheral device 102 as desired. For some examples, the execution environment 110 comprises a Python runtime environment. Additionally, for some examples, the execution environment 110 includes a plurality of runtime environments to support different types of scripts (e.g., written in different programming languages). The execution environment 110 may be one shared with other functionality hosted on the management processor 104, such as device discovery and configuration functionality. In various examples, the execution environment 110 is configured (e.g., modified) to restrict access to a subset of functionality provided by the execution environment 110. For instance, the execution environment 110 may be configured such that scripts executing in the execution environment 110 have restricted (or no) access to files, to non-essential operating system calls, or to system resources. In this way, the execution environment 110 can operate as a security sandbox in which a script imported from the peripheral device 102 can execute.

For some examples, the peripheral monitor 112 monitors the peripheral device 102 based on an output from the script executed by the execution environment. The peripheral monitor 112 may cause or control execution of the script 106 (e.g., periodic execution for peripheral device polling) in the execution environment 110. For various examples, when executed the script 106 may cause the peripheral monitor 112 to discover an event or condition (e.g., error condition) with respect to the peripheral device 102.

For some examples, the executed script 106 performs trend analysis on data points (e.g., regarding performance or status) captured from the peripheral device 102 over time. The executed script 106 may cause the management processor 104 to capture the data points, and may further cause the management processor 104 to store those data points locally in its memory or non-volatile data storage device. Once captured, the data points can be analyzed by the executed script 106 to identify a trend, such as one that indicates a possible problem with the peripheral device 102. For instance, the peripheral device 102 may comprise a thermal sensor and the executed script 106 identifies a trend that indicates that the range of temperature is climbing towards an alarm threshold. In another instance, the peripheral device 102 may comprise a network interface card (NIC) and the executed script 106 identifies a trend that indicates that the NIC is reporting data errors with increasing frequency.

In various examples, the executed script 106 controls how a set of monitor values, retrieved from the peripheral device 102 based on the executed script 106, is to be formatted for display (e.g., presentation to a user). For instance, the executed script 106 may control the value type formatting applied to a monitor value (e.g., integer value, enumerated value, text string), and may provide a text label that can be applied to the monitor value (e.g., when it is displayed on a graphical user interface or a printed report).

For some examples, the peripheral manager 114 performs a peripheral management function with respect to the peripheral device 102 based on monitoring of the peripheral device 102 by the peripheral monitor 112. Additionally, the peripheral manager 114 may perform the peripheral management function by executing the script 106 by the execution environment 110. According to various examples, the peripheral manager 114 performs the peripheral management function in response to the peripheral monitor 112 discovering an event or condition with respect to the peripheral device 102. As noted above, the peripheral monitor 112 may discover an event or condition based on a monitor value retrieved from the peripheral device 102 via execution of the script 106. Depending on the example, via the script 106, the peripheral manager 114 may respond to a discovered event or condition by way of a corrective action (e.g., enable, disable, restart or reconfigure the peripheral device 102), raising an alarm (e.g., with respect to the management processor 104), or sending an alert (e.g., to a remote management software).

For instance, the executed script 106 may report the discovered event or condition to the management processor 104 by way of a RESTful interface implemented by the management processor 104. The executed script 106 may send the discovered event or condition to a monitoring software application that is operating on a remote computing device (e.g., server) different from the computing device including the management processor 104 and that is in communication with the management processor 104. Additionally or alternatively, the executed script 106 may report an error or warning, and can provide data (e.g., error or debug code) with the report that supports the error or warning.

Figure 2:
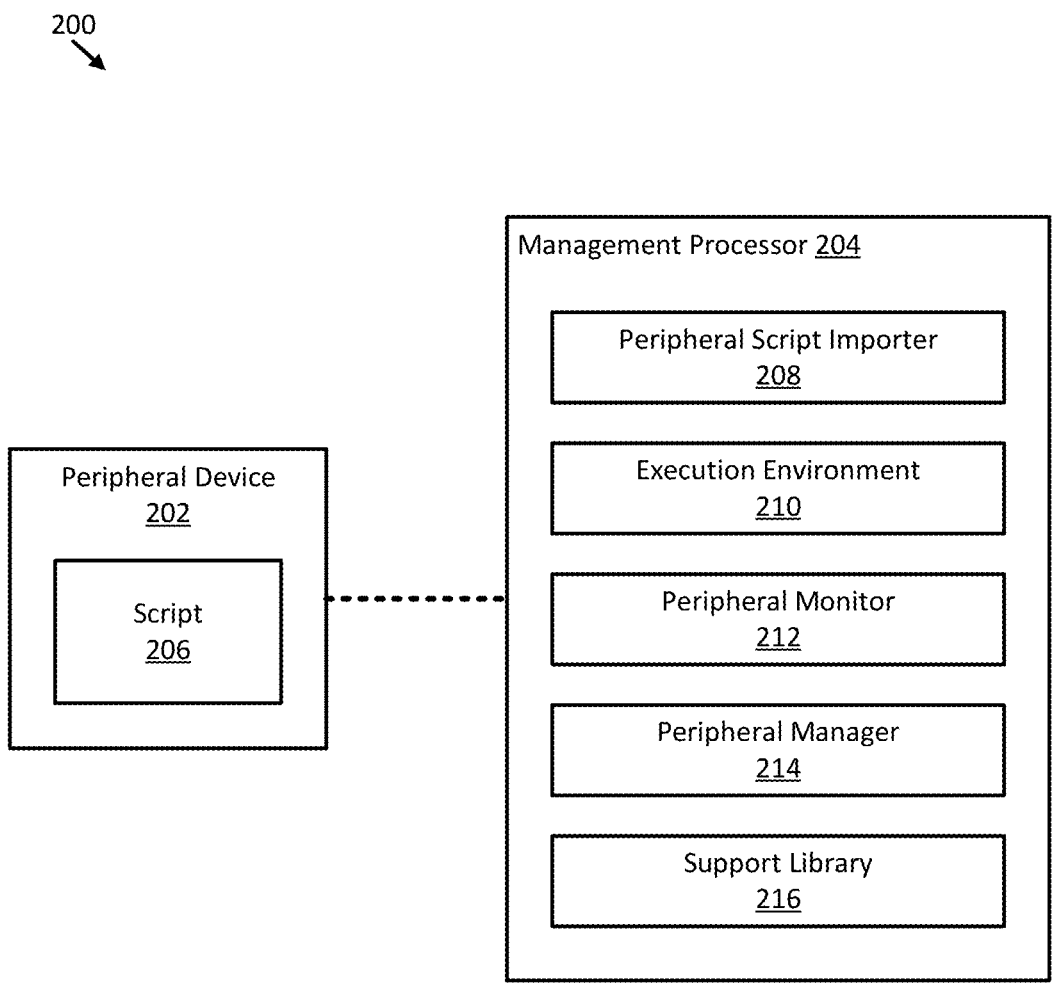

FIG. 2 is a block diagram illustrating an example computing device 200 including an example management processor 204 according to the present disclosure. In accordance with some examples, the management processor 204 implements a script-based approach to the monitoring or managing of peripheral devices as described herein. FIG. 2 illustrates a computing environment 200 (e.g., a computing device) in which a peripheral device 202 is coupled to the management processor 204. The peripheral device 202 includes a script 206, and the management processor 204 includes a peripheral script importer 208, an execution environment 210, a peripheral monitor 212, a peripheral manager 214, and a support library 216. For some examples, the peripheral device 202, the management processor 204, the script 206, the peripheral script importer 208, the execution environment 210, the peripheral monitor 212, and the peripheral manager 214 may be similar to the peripheral device 102, the management processor 104, the script 106, the peripheral script importer 108, the execution environment 110, the peripheral monitor 112, and the peripheral manager 114 described above with respect to FIG. 1. In various examples, the components or the arrangement of components in the peripheral device 202 or the management processor 204 may differ from what is depicted in FIG. 2.

For some examples, the support library 216 provides the execution environment 210 with access to a set of peripheral-generic functionalities that can be utilized by the script 206 in performing a monitoring or management function with respect to their respective peripheral device 202. For some examples, the script 206 utilizes at least one peripheral-generic functionality, from the set of peripheral-generic functionalities, to perform a monitoring or management task as described herein. While the script 206 can implement specific functionality with respect to the peripheral device 202, the peripheral-generic functionalities provided by the support library 216 can remain decoupled and independent from the peripheral device 202 and any of the peripheral device 202's firmware update cycles. Examples of script support functions provided through the support library 216 can include, without limitation: data communication functions facilitating exchange of data between the script 206 and the peripheral device 202; functionality for scheduling execution (e.g., periodic execution) of the script 206; protocol translators to translate data exchanged between the script 206 and the peripheral device 202 (e.g., ASN.1, XML, or JSON); arithmetic operations (e.g., standard deviation, variance, or line/curve fitting) to be performed on a monitor value retrieved from the peripheral device 202 by the script 206; or data conversion (e.g., temperature or data rate) applied to a register value retrieved from the peripheral device 202 by the script 206.

Figure 3:
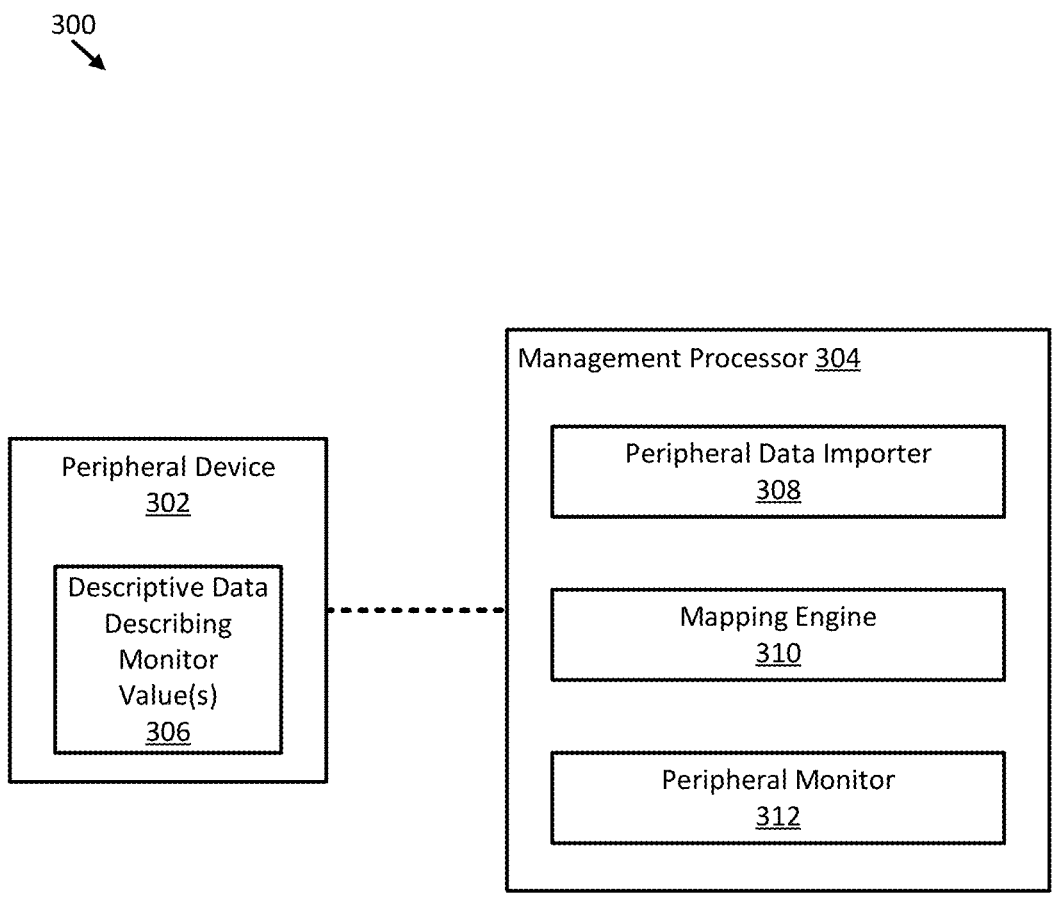

FIG. 3 is a block diagram illustrating an example management processor 304 according to the present disclosure. In accordance with some examples, the management processor 104 implements a descriptive data-based approach to the monitoring or managing of peripheral devices as described herein. FIG. 3 illustrates a computing environment 300 (e.g., a computing device) in which a peripheral device 302 is coupled to the management processor 304. Depending on the example, the peripheral device 302 may couple to the management processor 304 over a wired data path, which may be implemented by a data bus included in the computing environment 300. Alternatively, for some examples, the management processor 304 couples to the peripheral device 302 over a wireless data path within the computing environment 300. In various examples, the components or the arrangement of components in the peripheral device 302 or the management processor 304 may differ from what is depicted in FIG. 3.

In FIG. 3, the peripheral device 302 includes descriptive data 306 describing a set of monitor values retrievable on the peripheral device 302. In particular, the descriptive data 306 may comprise non-executable descriptive data that describes attributes of monitor values that can be retrieved from the peripheral device 302. Example attributes can include, without limitation: where on the peripheral device 302 the set of monitor values can be retrieved; how the peripheral device 302 can retrieve the set of monitor values from the peripheral device 302; how the set of monitor values retrieved from the peripheral device 302 is to be formatted (e.g., presented on a graphical user interface); where a monitor value retrieved from the peripheral device 302 can be presented; and how to determine whether a monitor value in the set of monitor values is valid. For instance, the descriptive data 306 can include an attribute that specifies a location for retrieving a monitor value, such as a location in a data structure of a file system, a device address (e.g., memory), an index, an object identifier, or a token. In another instance, the data 306 can include an attribute that specifies as a location in a data structure of a file system of the BMC 504 where a monitor value can be presented (e.g., entered), an identifier for a local service on the management processor 304 that the peripheral device 302 should contact to present the monitor value, or a network address (e.g., IP address) for a remote server to which the monitor value should be sent by the peripheral device 302.

As noted herein, the descriptive data 306 may include validation data that describes a valid value for at least one monitor value in the set of monitor values retrieved from the peripheral device. To describe a valid monitor value, the validation data may comprise a value range, a list of valid values, an algorithm, to determine validity of a particular monitor value, or some combination thereof. For instance, an example algorithm can include one that ensures that a monitored bandwidth of a virtual connection can be no greater than 80% of the associated physical link.

For some examples, the descriptive data 306 may be stored on a non-volatile data storage device (e.g., flash memory or the like) included by the peripheral device 302. The non-volatile data storage device (not shown) of the peripheral device 302 may be one that the peripheral device 302 uses to store its firmware. As noted herein, the peripheral device 302 can include, without limitation, a network interface card (NIC), a sensor, a storage device, and the like. The peripheral device 302 may communicate with the management processor 304 over a data bus, which the peripheral device 302 may couple to through a data bus interface (e.g., peripheral device slot).

The management processor 304 includes a peripheral data importer 308, a mapping engine 310, and a peripheral monitor 312. According to some example, the peripheral data importer 308 imports, from the peripheral device 302, a script associated with monitoring or managing the peripheral device 302. During the importation process, the peripheral data importer 308 may request the peripheral device 302 upload the descriptive data 306 to the management processor 304, and the peripheral device 302 may respond accordingly. The management processor 304 may store the descriptive data 306 in a non-volatile data storage device (not shown) included by the management processor 304.

The mapping engine 310 may determine, based on the descriptive data 306 imported from the peripheral device 302, a set of locations on the peripheral device 302 to access the set of monitor values. For some examples, the mapping engine 310 interprets the descriptive data 306 from the peripheral device 302 to determine the set of locations.

The peripheral monitor 312 may monitor the peripheral device 302 based on at least one monitor value, in the set of monitor values, retrieved from at least one location in the determined set of locations. A location in the set of locations may be such that when the location is sent to the peripheral device 302, it causes the peripheral device 302 to return a monitor value. The peripheral monitor 312 may retrieve the at least one monitor value from the peripheral device 302 from the at least one location in the determined set of locations. For some examples, the at least one monitor value retrieved from the peripheral device 302 may report an event or condition to the management processor 304 via the peripheral monitor 312. Depending on the example, the peripheral monitor 312 may utilize a RESTful interface implemented by the management processor 304 to report events or conditions to the management processor 304.

Figure 4:
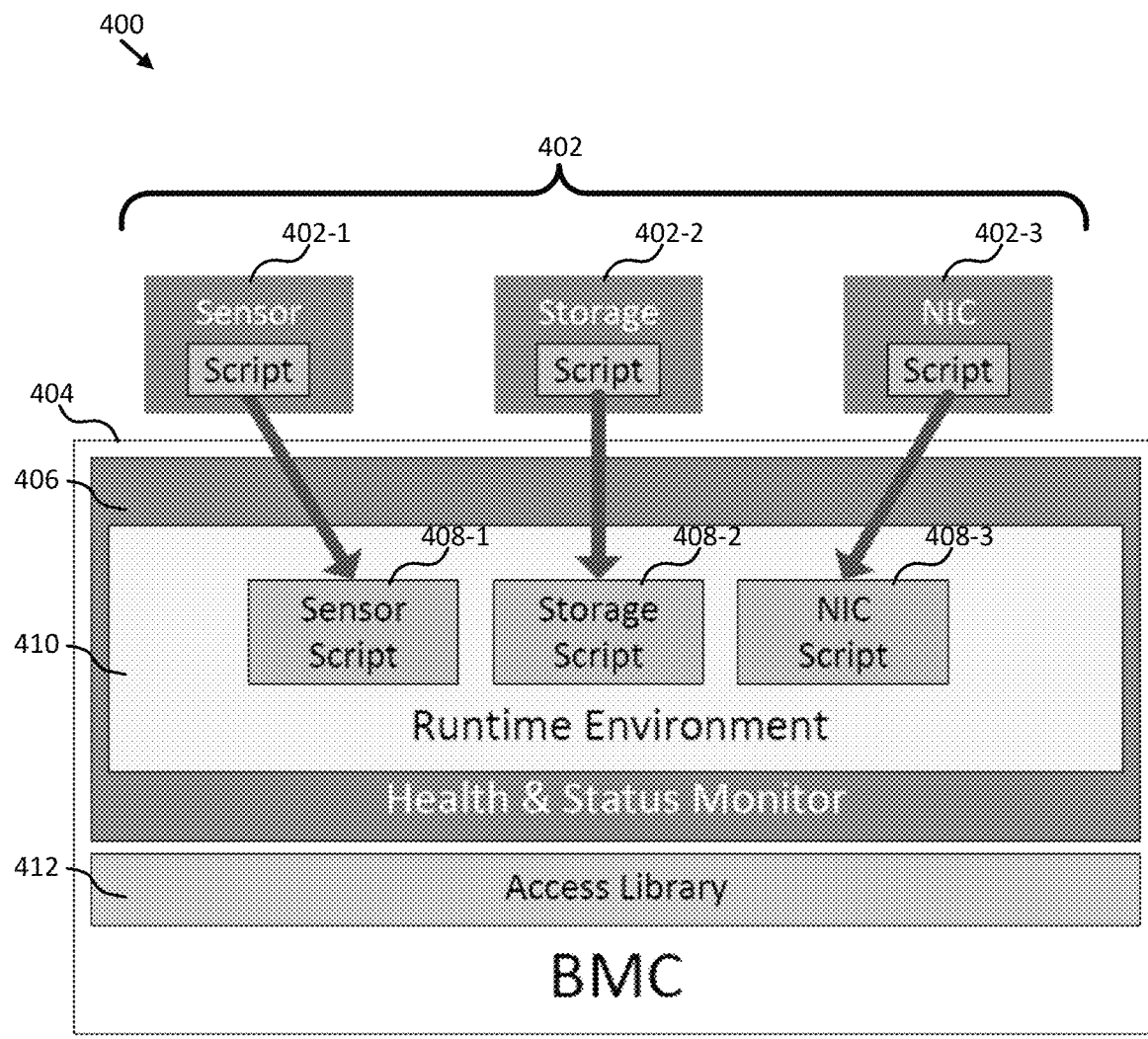

FIG. 4 is a block diagram illustrating an example management processor in accordance with the present disclosure. In particular, FIG. 4 illustrates a computing environment 400 (e.g., a computing device) in which a plurality of peripheral devices 402 is coupled to a baseboard management controller (BMC) 404. In accordance with some examples, the BMC 404 implements a script-based approach to the monitoring or managing of peripheral devices as described herein. In various examples, the components or the arrangement of components in the peripheral devices 402 or the BMC 404 may differ from what is depicted in FIG. 4.

As shown, the plurality of peripheral devices 402 include a sensor peripheral device 402-1, a storage peripheral device 402-2, and a network interface controller (NIC) peripheral device 402-3. As described herein, one or more of the peripheral devices 402 may couple to the BMC 404 over a wired data path, which may be implemented by a data bus included in the computing environment 400. Alternatively, for some examples, the BMC 404 couples to one or more of the peripheral devices 402 over a wireless data path within the computing environment 400. The number and types of peripheral devices 402 coupled to the BMC 404 may vary between examples. Other examples of peripheral devices can include, without limitation, user input devices, storage adapters (e.g., host bus adapters [HBAs]), display adapters, and the like. As also shown, each of the peripheral devices 402 includes a script that can be respectively imported by the BMC 404.

For some examples, a particular peripheral device may be of a specific class and a script included by the particular peripheral device may be: one that is generically applicable to the specific class and other classes of peripheral devices; one that is generically applicable to any peripheral device within the special class; one that is applicable to the make or model of the peripheral device; or one that is uniquely applicable to the peripheral device. For instance, the script included by the storage peripheral device 402-2 may be one that is applicable to storage and non-storage peripheral devices, one that is applicable to only storage peripheral devices, one that is applicable to the make or model of the storage peripheral device 402-2, and one that is uniquely applicable to all storage peripheral device 402-2.

In FIG. 4, the BMC 404 includes a health and status monitor 406 and an access library 412, and the health and status monitor 406 includes a runtime environment 410 for executing a script imported from one of the peripheral devices 402. In particular, the health and status monitor 406 can import a script from the sensor peripheral device 402-1 and load it on the runtime environment 410 as sensor script 408-1. Likewise, the health and status monitor 406 can import a script from the storage peripheral device 402-2 and load it on the runtime environment 410 as storage script 408-2, and can import a script from the NIC peripheral device 402-3 and load it on the runtime environment 410 as NIC script 408-3

Once loaded to the runtime environment 410, one or more of the scripts 408 can be executed in the runtime environment 410 by the health and status monitor 406 to perform a monitor or management functionality with respect to one or more of the peripheral devices 402. In particular, by executing the storage script 408-2 in the runtime environment 410, the health and status monitor 406 may retrieve a monitor value from the storage peripheral device 402-2, which may indicate the occurrence of an event or the existence of a condition with respect to the storage peripheral device 402-2. For instance, the monitor value retrieved from the storage peripheral device 402-2 via the storage script 408-2 may indicate that the storage peripheral device 402-2 has halted data operations.

Additionally, as described herein, the storage script 408-2 may include functionality to respond to an event or condition discovered by the monitor value, and functionality may respond by performing a corrective action, raising an alarm, or sending an alert. For instance, upon discovering the halt condition described above, the storage script 408-2 executing in the runtime environment 410 may issue a device restart command to the storage peripheral device 402-2 as a corrective action. The script 408-2 executing in the runtime environment 410 may raise an alarm on the BMC 404 regarding the halt condition. The script 408-2 executing in the runtime environment 410 may send an alert regarding the halt condition to a remote management software in communication with the BMC 404, which in turn may instruct the BMC 404 to respond with a corrective action via a functionality provided by the storage script 408-2).

Further, the storage script 408-2 when executed in the runtime environment 410 may enable the health and status monitor 406 to discover an event or condition of the storage peripheral device 408-2 by way of identifying a trend with respect to a set of monitor values retrieved from the peripheral device via the storage script 408-2. For instance, the storage script 408-2 when executed in the runtime environment 410 may: cause capture of data points regarding on a monitor value associated with an data error rate of the storage peripheral device 402-2 over a period; cause storage of the captured data points on local memory (e.g., of the BMC 404); and perform a trend analysis on the stored data points to identify a possible data trend with respect to the data error rate. Based on a data trend identified by the storage script 408-2, the storage script 408-2 may determine the presence, the imminent presence, or possible likelihood of data write or data read failure with respect to the storage peripheral device 402-2.

The access library 412 may comprise a set of peripheral-generic functionalities that can be utilized by the scripts 408 in performing a monitoring or management function with respect to their respective peripheral device. Examples of the peripheral generic functionalities provided by the access library 412 can include, without limitation: data communication functions facilitating exchange of data between one of the scripts 408 and one of the peripheral devices 402; functionality for scheduling execution (e.g., periodic execution) of one of the scripts 408; protocol translators to translate data exchanged between one of the scripts 408 and one of the peripheral devices 402 (e.g., ASN.1, XML, or JSON); arithmetic operations (e.g., standard deviation, variance, or line/curve fitting) to be performed on a monitor value retrieved from one of the peripheral devices 402 by one of the scripts 408; or data conversion (e.g., temperature or data rate) applied to a register value retrieved from one of the peripheral devices 402 by one of the scripts 408.

Figure 5:
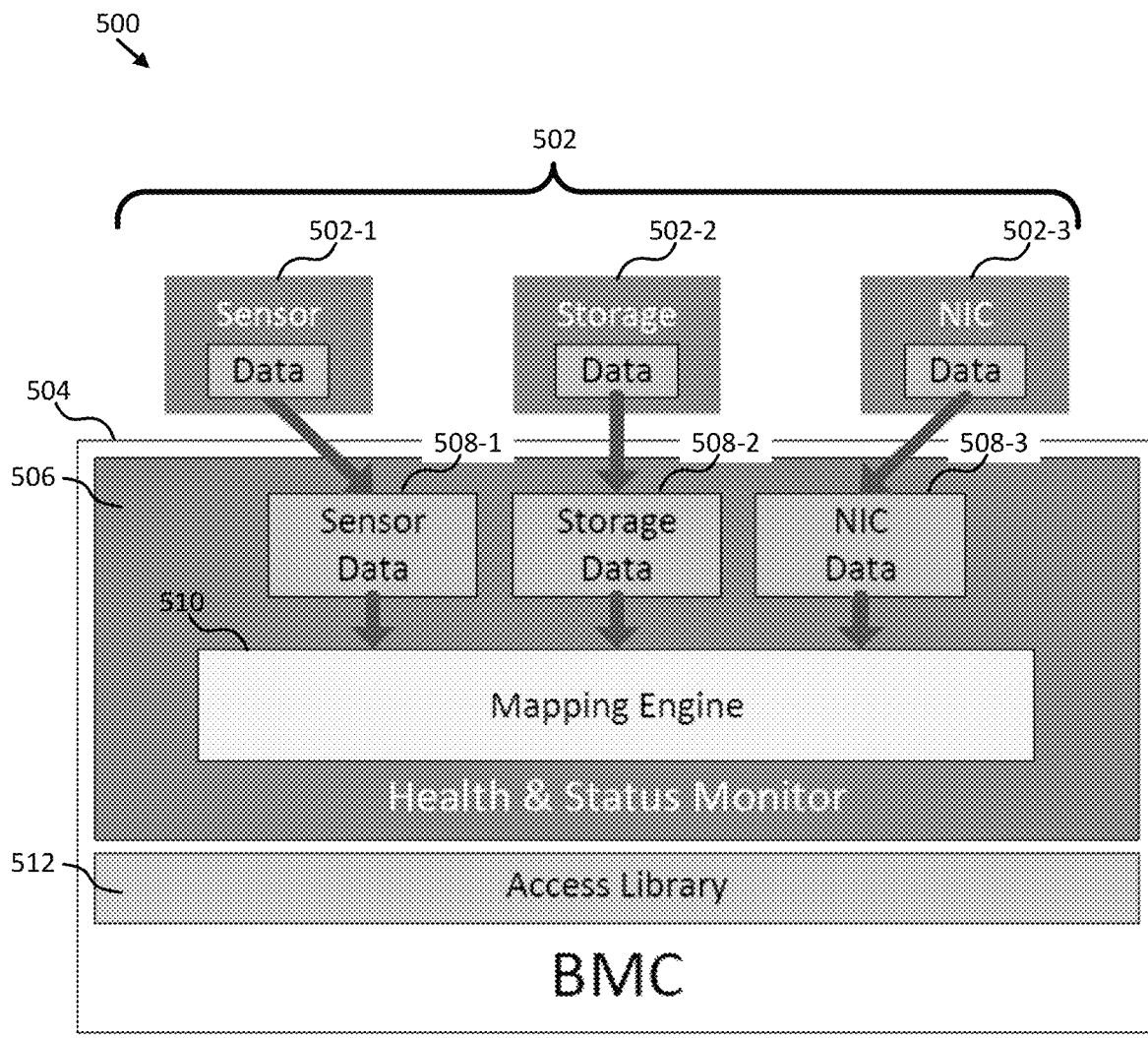

FIG. 5 is a block diagram illustrating an example BMC 504 in accordance with the present disclosure. In particular, FIG. 5 illustrates a computing environment 500 (e.g., a computing device) in which a plurality of peripheral devices 502 is coupled to a baseboard management controller (BMC) 504. In accordance with some examples, the BMC 504 implements a descriptive data-based approach to the monitoring or managing of peripheral devices as described herein. In various examples, the components or the arrangement of components in the peripheral devices 502 or the BMC 504 may differ from what is depicted in FIG. 5.

As shown, the plurality of peripheral devices 502 include a sensor peripheral device 502-1, a storage peripheral device 502-2, and a network interface controller (NIC) peripheral device 502-3. As described herein, one or more of the peripheral devices 502 may couple to the BMC 504 over a wired data path, which may be implemented by a data bus included in the computing environment 500. Alternatively, for some examples, the BMC 504 couples to one or more of the peripheral devices 502 over a wireless data path within the computing environment 500. The number and types of peripheral devices 502 coupled to the BMC 504 may vary between examples. Other examples of peripheral devices can include, without limitation, user input devices, storage adapters (e.g., host bus adapters [HBAs]), display adapters, and the like. As also shown, each of the peripheral devices 502-1, 502-2, and 502-3 includes data that can be respectively imported by the BMC 504. For some examples, the data comprises non-executable descriptive data that describes (e.g., attributes of) a set of monitor values on the peripheral device for monitoring purposes. The BMC 504 may perform a monitoring or management task by utilizing generic (built-in) code to process a monitor value retrieved by the BMC 504 from the peripheral device based on the descriptive data.

In FIG. 5, the BMC 504 includes a health and status monitor 506, and the health and status monitor 506 includes a mapping engine 510 for interpreting descriptive data imported from one of the peripheral devices 502. In particular, the health and status monitor 506 can import descriptive data from the sensor peripheral device 502-1 and feed it to the mapping engine 510 as sensor descriptive data 508-1. Likewise, the health and status monitor 506 can import descriptive data from the storage peripheral device 502-2 and feed to the mapping engine 510 as storage descriptive data 508-2, and can import a descriptive data from the NIC peripheral device 502-3 and feed it to the mapping engine 510 as NIC descriptive data 508-3

Upon feeding descriptive data from one of the peripheral devices 502 to the mapping engine 510, the mapping engine 510 may interpret the descriptive data and determine attributes for a set of monitor values on that peripheral device. An attribute determined by the mapping engine 510 can include a location on respective peripheral device from which a monitor value can be retrieved, such as a location in a data structure of a file system, a device address (e.g., memory address), an index, an object identifier, or a token. Another attribute can include a location in a data structure of a file system on the BMC 504 where a monitor value can be presented (e.g., entered) by the peripheral device, an identifier for a local service on the BMC 504 that the peripheral device should contact to present the monitor value, or a network address (e.g., IP address) for a remote server to which the monitor value should be sent by the peripheral device. Another attribute can include a data size for the monitor value (e.g., number of bytes), a display format type for the monitor value, or how a monitor value retrieved from the peripheral device can be formatted for display (e.g., to a user).

The descriptive data of one of the peripheral devices 502 can include validation data that describes a valid value for at least one monitor value in the set of monitor values retrieved from that peripheral device. The mapping engine 510 may validate the at least one monitor value when the monitor value is retrieved by the BMC 504 from the peripheral device.

Figure 6:
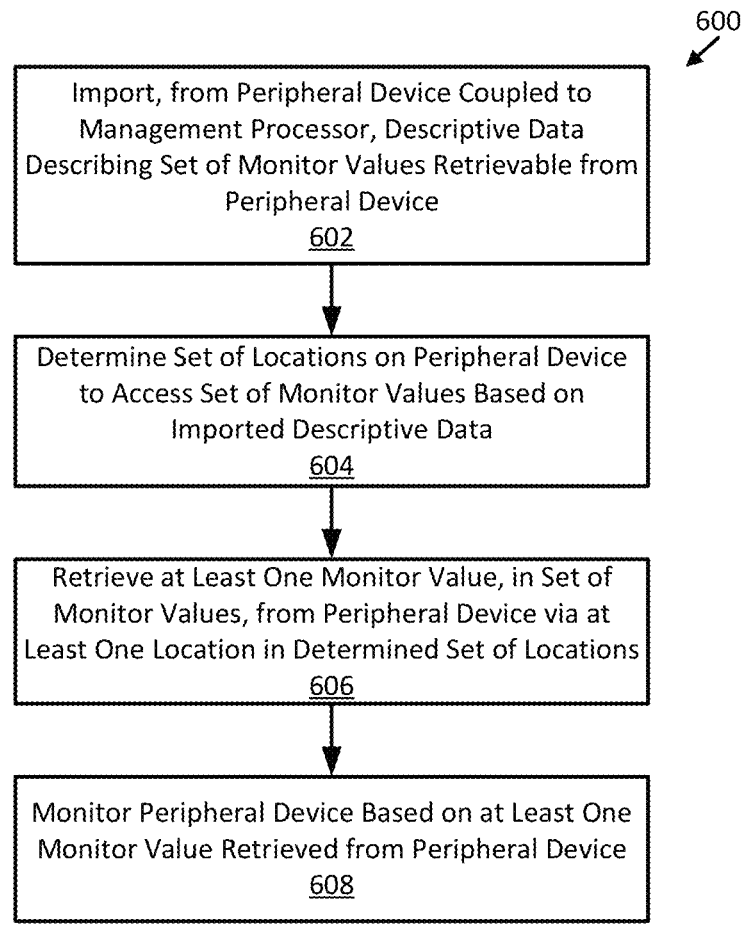
FIGS. 6 and 7 are flow diagrams illustrating example methods for monitoring a peripheral device according to the present disclosure.

FIG. 6 is a flow diagram illustrating an example method 600 for monitoring a peripheral device according to the present disclosure. In particular, the method 600 may be performed by a management processor, such as the management processor 304 or a baseboard management controller (BMC) included by a computing device (e.g., server). In accordance with some examples, the method 600 implements a descriptive data-based approach to the monitoring or managing of peripheral devices as described herein. Although execution of the method 600 is described below with reference to the management processor 304 of FIG. 3, execution of the method 600 by other suitable systems or devices may be possible. The method 600 may be implemented in the form of executable instructions stored on a machine-readable medium or in the form of electronic circuitry.

In FIG. 6, the method 600 may begin at block 602, with the management processor 304 importing, from a peripheral device (e.g., 302), descriptive data describing a set of monitoring vales that is retrievable from the peripheral device. As noted herein, the data imported from the peripheral device may comprise non-executable description data and may describe a set of attributes for a set of monitor values that can be retrieved from the peripheral device.

The method 600 may continue to block 604, with the management processor 304 determining a set of locations, on the peripheral device, from which the set of monitor values can be accessed. As noted herein, the set of locations may correspond to locations, on a non-volatile data storage device included by the peripheral device, that can or are storing one or more monitor values in the set of monitor values described by the data imported at block 602. The method 600 may continue to block 606, with the management processor 304 retrieving at least one monitor value, in the set of monitor values, from the peripheral device via at least one location in the set of location determined at block 604. The method 600 may continue to block 608, with the management processor 304 monitoring the peripheral device based on the at least one monitor value retrieved at block 606.

Figure 7:
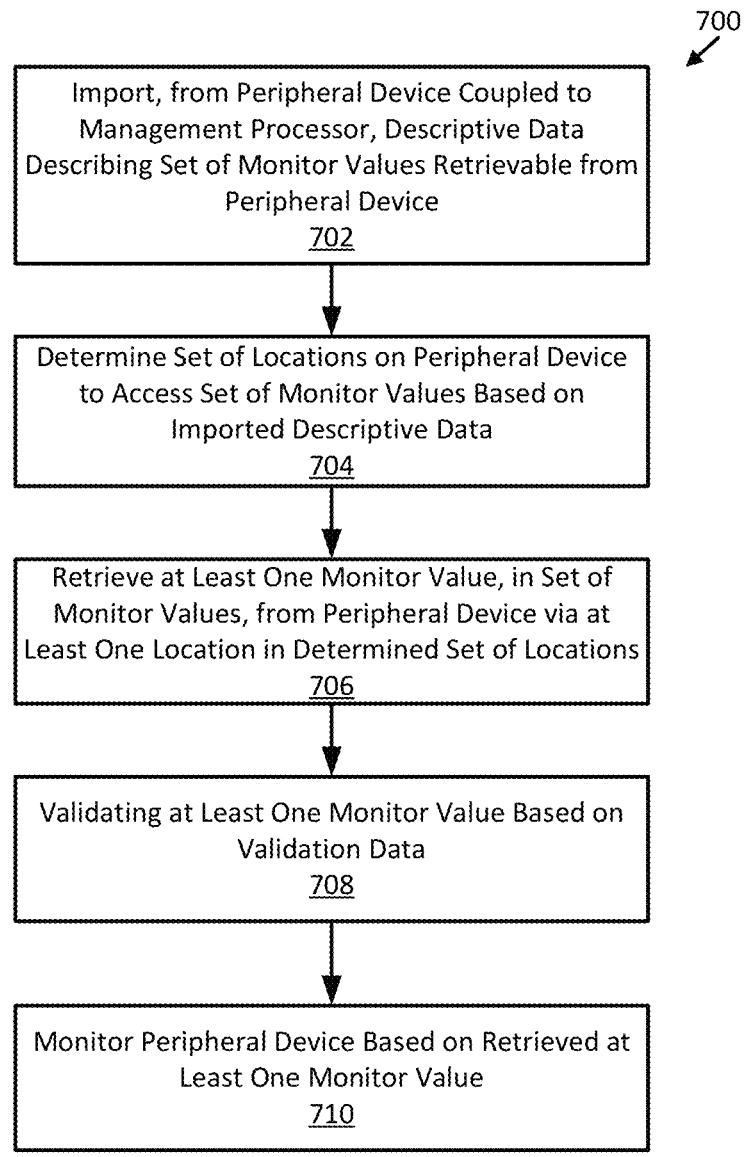

FIG. 7 is a flow diagram illustrating an example method 700 for monitoring a peripheral device according to the present disclosure. In particular, the method 700 may be performed by a management processor, such as the management processor 304 or a baseboard management controller (BMC) included by a computing device (e.g., server). In accordance with some examples, the method 700 implements a descriptive data-based approach to the monitoring or managing of peripheral devices as described herein. Although execution of the method 700 is described below with reference to the management processor 304 of FIG. 3, execution of the method 700 by other suitable systems or devices may be possible. The method 700 may be implemented in the form of executable instructions stored on a machine-readable medium or in the form of electronic circuitry.

In FIG. 7, the method 700 may begin at block 702, with the management processor 304 importing, from a peripheral device (e.g., 302), descriptive data describing a set of monitoring vales that is retrievable from the peripheral device and including validation data. The method 700 may continue to blocks 704 and 706, which may be similar in operation to blocks 604 and 606 of the method 600 as described above with respect to FIG. 6. The method 700 may continue to block 708, with the management processor 304 validating the at least one monitor value, retrieved at block 706, based on the validation data including by the data imported at block 702. The method 700 may continue to block 710, with the management processor 304 monitoring the peripheral device based on the at least one monitor value retrieved at block 706.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A management processor, comprising:
a peripheral script importer to import, from a peripheral device coupled to the management processor, a script associated with monitoring the peripheral device;
an execution environment to execute, within the management processor, at least a portion of the script to initiate communication with the peripheral device;
a peripheral monitor to receive one or more monitor values from the peripheral device based on the script executed by the execution environment; and
a peripheral manager to perform, by execution of the script by the execution environment, a peripheral management function with respect to the peripheral device based on the one or more monitor values received from the peripheral device.

2. The management processor of claim 1, comprising a support library to provide the execution environment with access to a set of peripheral-generic functions, wherein via the execution environment, the script utilizes at least one function from the set of peripheral-generic functions.

3. The management processor of claim 2, wherein the set of peripheral-peripheral-generic functions includes a scheduling function that causes at least a portion of the script to periodically execute in the execution environment.

4. The management processor of claim 2, wherein the set of peripheral-peripheral-generic functions includes a function that assists in performing trend analysis on performance of the peripheral device.

5. The management processor of claim 2, wherein the set of peripheral-peripheral-generic functions includes a function that converts a peripheral register value to a unit of measure relating to the peripheral device.

6. The management processor of claim 2, wherein the set of peripheral-peripheral-generic functions includes a function relates to data protocol translation.

7. The management processor of claim 1, wherein the script is associated with a class of peripheral devices associated with the peripheral device.

8. The management processor of claim 1, wherein the script is uniquely associated with a make and model of the peripheral device.

9. A method, comprising:
importing script data from a peripheral device;

executing the script data to initiate communication with the peripheral device;

monitoring the peripheral device based on an output from the executed script data, including receiving one or more monitor values from the peripheral device; and performing one or more peripheral management functions with respect to the peripheral device based on the one or more monitor values received from the peripheral device.

10. The method of claim 9, wherein executing the script data comprises accessing at least one function from a set of peripheral-generic functions.

11. The method of claim 10, wherein the set of peripheral-generic functions includes a scheduling function that causes at least a portion of the script data to periodically execute.

12. The method of claim 10, wherein the set of peripheral-generic functions includes a function that assists in performing trend analysis on performance of the peripheral device.

13. The method of claim 10, wherein the set of peripheral-generic functions includes a function that converts a peripheral register value to a unit of measure relating to the peripheral device.

14. The method of claim 10, wherein the set of peripheral-generic functions includes a relating to data protocol translation.

15. At least one non-transitory computer readable medium having instructions stored thereon, which when executed by one or more processors, cause the processors to:

import script data from a peripheral device;

execute the script data to initiate communication with the peripheral device;

monitor the peripheral device based on an output from the executed script data, including receiving one or more monitor values from the peripheral device; and perform one or more peripheral management functions with respect to the peripheral device based on the one or more monitor values received from the peripheral device.

16. The computer readable medium of claim of claim 15, wherein executing the script data comprises accessing at least one function from a set of peripheral-generic functions.

17. The computer readable medium of claim 16, wherein the set of peripheral-generic functions includes a scheduling function that causes at least a portion of the script data to periodically execute.

18. The computer readable medium of claim 16, wherein the set of peripheral-generic functions includes a function that assists in performing trend analysis on performance of the peripheral device.

19. The computer readable medium of claim 16, wherein the set of peripheral-generic functions includes a function that converts a peripheral register value to a unit of measure relating to the peripheral device.

20. The computer readable medium of claim 16, wherein the set of peripheral-generic functions includes a relating to data protocol translation.

* * * * *